(12) United States Patent
Hong et al.

(10) Patent No.: US 8,735,824 B2
(45) Date of Patent: May 27, 2014

(54) INFRARED SENSOR MODULE

(75) Inventors: Jun Pyo Hong, Suwon-si (KR); Jea Yun So, Goyang-si (KR); Sang Sik Yoon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 211 days.

(21) Appl. No.: 13/317,939

(22) Filed: Nov. 1, 2011

(65) Prior Publication Data

US 2012/0119091 A1    May 17, 2012

(30) Foreign Application Priority Data

Nov. 17, 2010  (KR) ........................ 10-2010-0114463

(51) Int. Cl.
*G01S 17/48* (2006.01)
*G01C 3/10* (2006.01)

(52) U.S. Cl.
CPC .. *G01S 17/48* (2013.01); *G01C 3/10* (2013.01)
USPC ...... 250/341.7; 356/3.06; 356/3.08; 356/3.11

(58) Field of Classification Search
CPC ............. G01C 3/10; G01C 3/24; G01S 17/48
USPC ............. 356/3.06, 3.08, 3.11; 250/341.7, 349
See application file for complete search history.

(56) References Cited

U.S. PATENT DOCUMENTS

| 3,792,928 A | * | 2/1974 | Poilleux ..................... 356/4.07 |
| 4,240,745 A | | 12/1980 | Green |
| 4,514,083 A | * | 4/1985 | Fukuoka ..................... 356/3.08 |
| 6,038,496 A | * | 3/2000 | Dobler et al. ..................... 701/3 |

FOREIGN PATENT DOCUMENTS

EP    2848664    6/2004

OTHER PUBLICATIONS

Extended European Search Report dated Feb. 7, 2012 issued in corresponding European Patent Application No. 11188525.7.

* cited by examiner

*Primary Examiner* — Constantine Hannaher
(74) *Attorney, Agent, or Firm* — Staas & Halsey LLP

(57) ABSTRACT

An infrared sensor module includes a first infrared sensor that includes a first light emitting unit configured to emit infrared light to an object and a first light receiving unit configured to detect an amount of infrared light reflected from the object, a second infrared sensor that includes a second light emitting unit configured to emit infrared light to the object and a second light receiving unit configured to detect an amount of the infrared light reflected from the object, and a controller to measure reflectivity of the object using a peak output voltage of the first light receiving unit, and to measure a distance to the object using not only the measured object reflectivity but also an output voltage of the second light receiving unit. As a result, the distance from the infrared sensor to the object can be correctly measured irrespective of the reflectivity of the object.

20 Claims, 14 Drawing Sheets

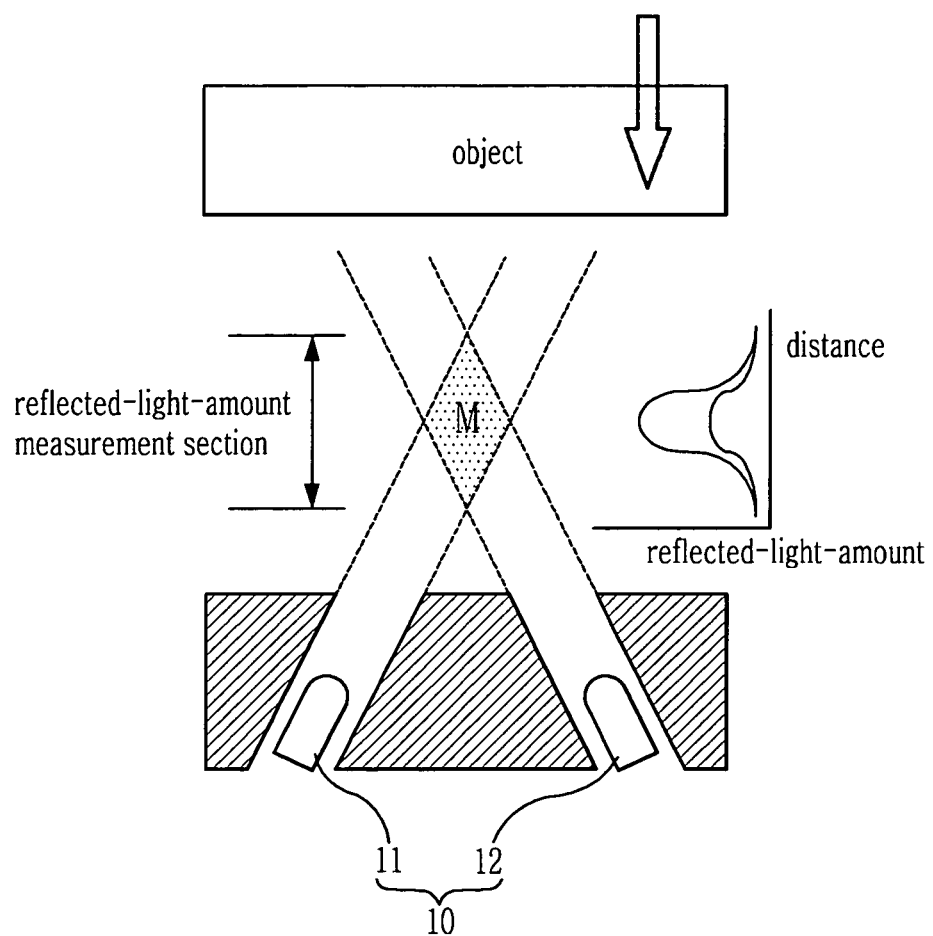
FIG. 1 – Related Art

FIG. 2 – Related Art
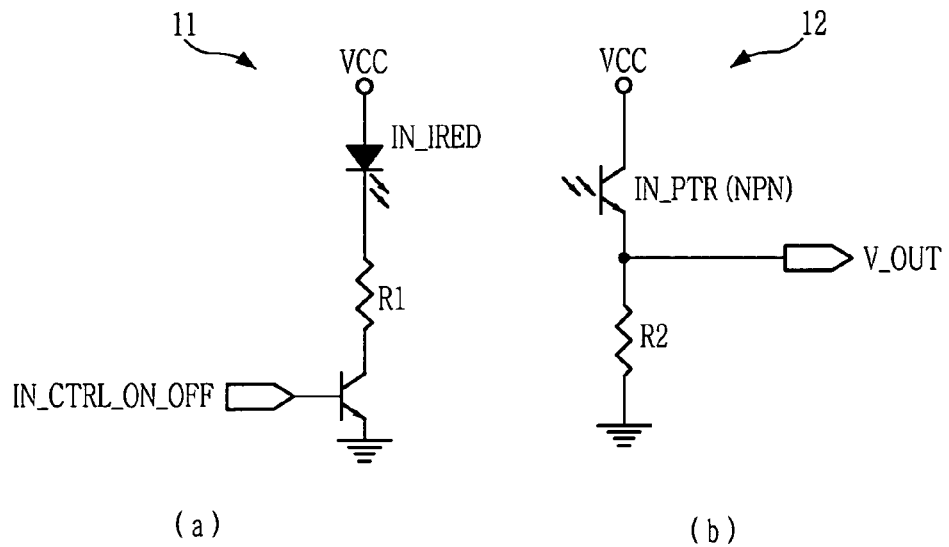
(a)  (b)
FIG. 3 – Related Art
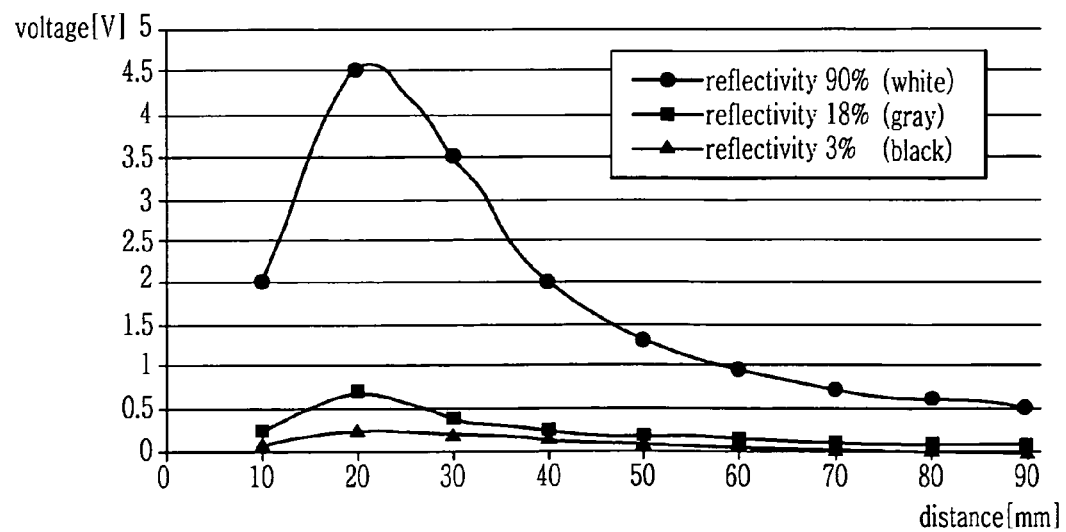

FIG. 6
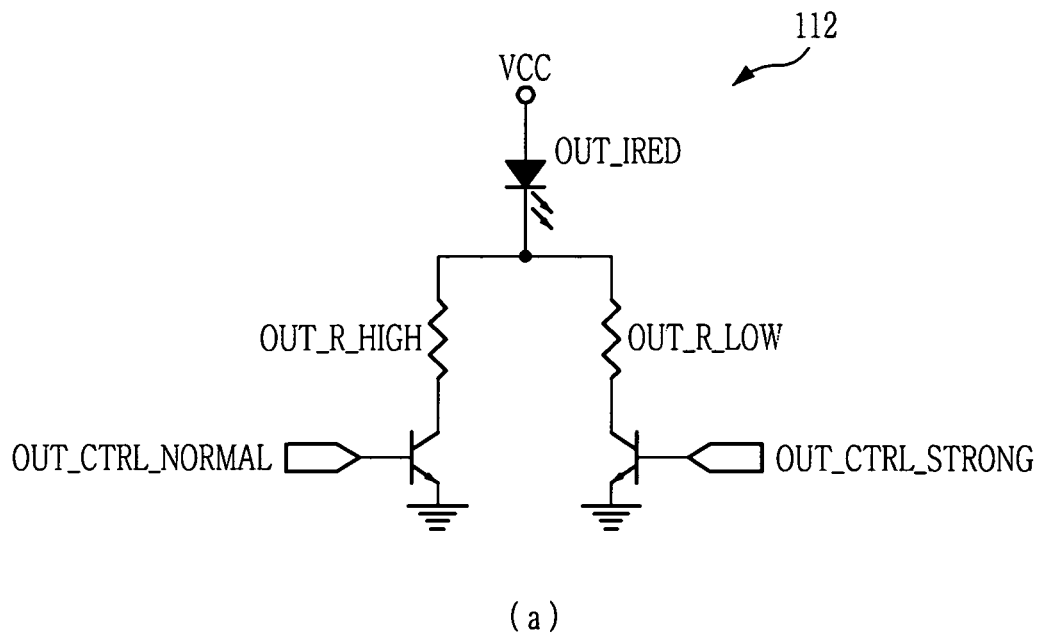
(a)
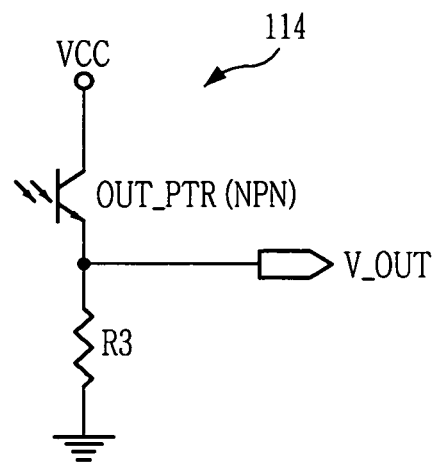
(b)

FIG. 8

| reflectivity (%) | magnitude [V] at peak point |
|---|---|
| 90 ← | 4.6 |
| 18 | 0.7 |
| 3 | 0.2 |

(a)

| reflectivity (%) | magnitude [V] at peak point |
|---|---|
| 90 | - |
| 18 ← | 4.2 |
| 3 ← | 1.5 |

(b)

FIG. 9
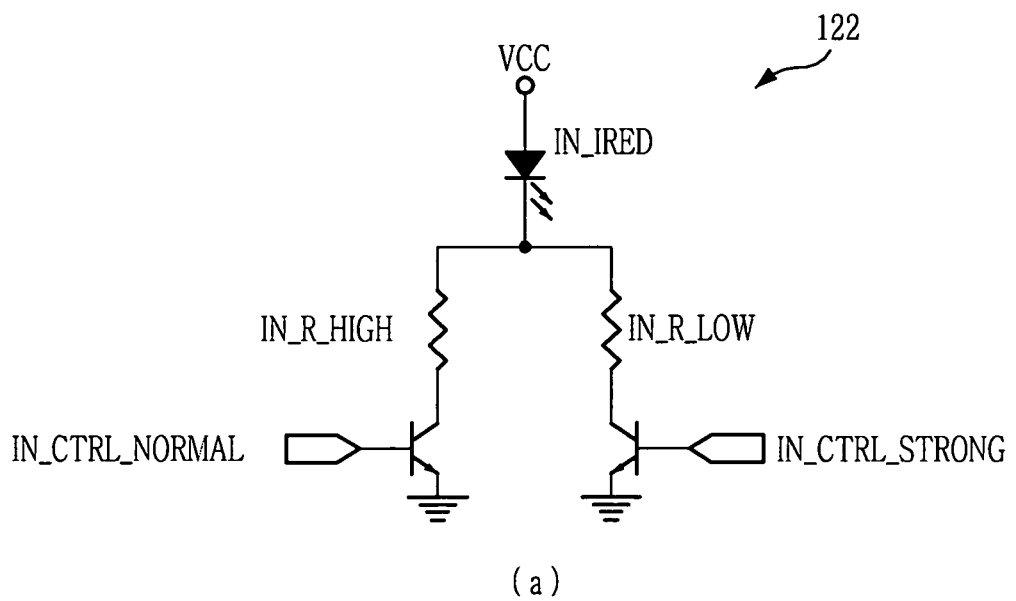
(a)
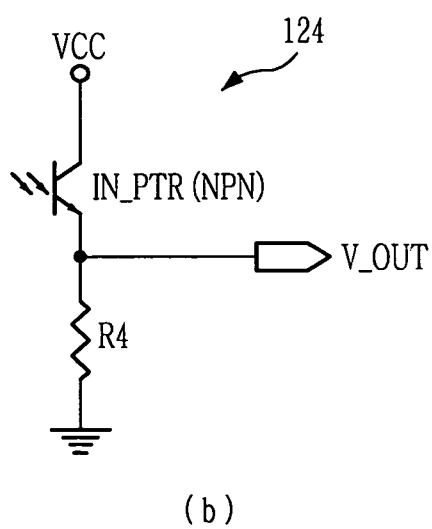
(b)

FIG. 10

| reflectivity 3% | |
|---|---|
| output voltage [V] | distance [mm] to object |
| 0.2 | 20 |
| 0.1 | 40 |
| - | - |
| - | - |

| reflectivity 3% | |
|---|---|
| output voltage [V] | distance [mm] to object |
| 1.5 | 20 |
| 0.9 | 40 |
| 0.4 | 60 |
| 0.2 | 80 |

| reflectivity 18% | |
|---|---|
| output voltage [V] | distance [mm] to object |
| 0.7 | 20 |
| 0.3 | 40 |
| 0.2 | 60 |
| 0.1 | 80 |

| reflectivity 18% | |
|---|---|
| output voltage [V] | distance [mm] to object |
| 4.1 | 20 |
| 1.5 | 40 |
| 0.8 | 60 |
| 0.4 | 80 |

| reflectivity 90% | |
|---|---|
| output voltage [V] | distance [mm] to object |
| 4.2 | 20 |
| 2 | 40 |
| 0.9 | 60 |
| 0.5 | 80 |

| reflectivity 90% | |
|---|---|
| output voltage [V] | distance [mm] to object |
| - | - |
| - | - |
| - | - |
| - | - |

(a)  (b)

INFRARED SENSOR MODULE

CROSS-REFERENCE TO RELATED APPLICATIONS

This application claims the benefit of Korean Patent Application No. 2010-0114463, filed on Nov. 17, 2010 in the Korean Intellectual Property Office, the disclosure of which is incorporated herein by reference.

BACKGROUND

1. Field

Embodiments of the present disclosure relate to an infrared sensor module capable of measuring a distance to an obstacle (object) using an infrared sensor.

2. Description of the Related Art

Generally, a robot cleaner moves about a target area to be cleaned without receiving a control signal from a user and collects foreign matter, such that it can automatically clean the target area. The robot cleaner measures the distance from the robot cleaner to an obstacle (object) (for example, furniture, office equipment, and walls) installed in the target area through an obstacle sensor, and moves about the target area without colliding with the obstacle using the measured distance information, thereby cleaning the target area.

A variety of sensors may be used as the obstacle sensor, for example, an ultrasonic sensor, a Position Sensitive Detector (PSD) sensor, an infrared sensor, etc. The most popular obstacle sensor from among the above-mentioned sensors is the infrared sensor because the infrared sensor is cheapest.

FIG. 1 is a schematic diagram illustrating an arrangement of a light emitting unit and a light receiving unit contained in a conventional infrared sensor. Referring to FIG. 1, the infrared sensor 10 generally includes a light emitting unit 11 having an infrared light emitting diode (IRED) for emitting infrared light, and a light receiving unit 12 including a photo resistor (PTR) or photo diode (PD) to detect the amount of reflected light. The infrared sensor 10 detects the light amount generated when the light emitted from the light emitting unit 11 is reflected from the surface of the object and is then incident upon the light receiving unit 12, and measures the distance from the infrared sensor 10 to the object using the detected light amount. In this case, the light emitting unit 11 and the light receiving unit 12 of the infrared sensor 10 are arranged in such a manner that, when the infrared sensor 10 gradually approaches the object or the object approaches the infrared sensor 10, the distance from the infrared sensor 10 to the object is decided such that a characteristic curve of the reflected light obtained at the center point (i.e., a horizontal diagonal point of a diamond shape shown in FIG. 1) of the reflected-light-amount measurement section M reaches a peak point. Herein, the reflected-light-amount measurement section M is established in such a manner that the robot cleaner, which desires to detect the object (obstacle) or to move slowly, includes a specific distance (e.g., 20 mm) from the infrared sensor 10 to the object. Specifically, the specific distance is located in the vicinity of the maximum of the characteristic curve of the amount of reflected light in the reflected-light-amount measurement section M.

FIG. 2, parts (a) and (b), shows a circuit diagram illustrating a light emitting unit and a light receiving unit in the conventional infrared sensor. Referring to FIG. 2, part (a), the light emitting unit 11 includes a light emitting diode (IN_IRED), a current limiting resistor R1, and a light emitting control switching element (IN_CTRL_ON_OFF) for receiving on/off control signals of the light emitting diode (IN_IRED). Meanwhile, as shown in FIG. 2 part (b), the light receiving unit 12 includes a light receiving element (IN_PTR (NPN)), an output resistor (R2), and an output voltage terminal (V_OUT).

Ideally, although it is necessary for the light receiving unit 12 to detect the amount of light corresponding to the distance from the infrared sensor 10 to the object, the important matter in measuring the distance from the infrared sensor 10 to the object using the infrared sensor 10 is surface reflectivity (hereinafter referred to simply as 'reflectivity') depending on the object color. FIG. 3 is a graph illustrating the characteristic curve of the output voltage (the amount of reflected light) of the light receiving unit in response to both the distance from the infrared sensor to the object and reflectivity of each object. As can be seen from FIG. 3, the object (e.g., a white object) having reflectivity of 90% has a higher output voltage (greater reflected light amount or greater received light amount) as compared to another object having relatively low reflectivity (object having reflectivity of 18% or 3%). That is, the output voltage of the light receiving unit 12 changes depending upon the reflectivity of the object being sensed.

Assuming that the infrared sensor 10 is used as an obstacle sensor of the robot cleaner in such a manner that the robot cleaner stops motion and slowly moves at a position spaced apart from the object located ahead by a predetermined distance, the robot cleaner is implemented to stop motion or to slowly move upon receiving infrared light of more than a predetermined light amount. For example, if a comparison voltage (voltage corresponding to specific light amount) of FIG. 3 is set to 0.5V, it is determined that the object (white object) having a reflectivity of 90% has been detected at a specific position spaced apart from the infrared sensor 10 by 90 mm, and it is also determined that another object (gray object) having reflectivity of 18% has been detected at a specific position spaced apart from the infrared sensor 10 by 27 mm. In contrast, the robot cleaner never detects the object (black object) having reflectivity of 3%. That is, in order to detect a high-reflectivity object (e.g., a white object), the robot cleaner stops or slowly moves at a distance from the object. In order to detect a low-reflectivity object (e.g., a gray- or black-object), the robot cleaner may stop or slowly move at a position very close to the object, or the robot cleaner may sometimes collide with the object if no signal is received from the object.

As described above, the output voltage (the amount of reflected or received light) of the light receiving unit 12 is affected not only by the distance from the infrared sensor 10 to the object, but also by reflectivity of the object. Therefore, it is difficult for the conventional infrared sensor 10 to correctly recognize the distance from the infrared sensor 10 to the object only using the amount of light applied to the light receiving unit without considering reflectivity of the approaching object.

SUMMARY

Therefore, it is an aspect of the present disclosure to provide an infrared sensor module which can correctly measure the distance from the infrared sensor module to the object irrespective of object reflectivity, using a two-step measurement scheme in which the infrared sensor module measures reflectivity of the approaching object and then measures the distance from the infrared sensor to the object on the basis of the measured reflectivity.

Additional aspects of the disclosure will be set forth in part in the description which follows and, in part, will be apparent from the description, or may be learned by practice of the disclosure.

In accordance with one aspect of the present disclosure, an infrared sensor module includes a first infrared sensor that includes a first light emitting unit configured to emit an infrared light to an object and a first light receiving unit configured to detect an amount of an infrared light reflected from the object, a second infrared sensor that includes a second light emitting unit configured to emit the infrared light to the object and a second light receiving unit configured to detect an amount of the infrared light reflected from the object, and a controller to measure reflectivity of the object using a peak output voltage of the first light receiving unit, and to measure a distance to the object using not only the measured object reflectivity but also an output voltage of the second light receiving unit.

The first infrared sensor may be arranged at the outside of the second infrared sensor.

The controller may control the first light emitting unit to alternately emit one intensity of infrared light having two or more emission intensities when measuring the object reflectivity.

The controller may control the second light emitting unit to emit one intensity of infrared light when measuring the distance to the object.

The controller may control the second light emitting unit to emit infrared light having two or more emission intensities when measuring the distance to the object.

The infrared sensor module may further include a memory to store not only a lookup table that indicates reflectivity corresponding to a peak output voltage of the first light receiving unit in association with emission of the infrared light having two or more emission intensities of the first light emitting unit, but also a distance lookup table that depends not only upon the reflectivity associated with emission of one intensity of infrared light of the second light emitting unit but also an output voltage of the second light receiving unit.

The infrared sensor module may further include a memory to store not only a lookup table that indicates reflectivity corresponding to a peak output voltage of the first light receiving unit in association with emission of the infrared light having two or more emission intensities of the first light emitting unit, but also a distance lookup table that depends not only upon the reflectivity associated with emission of the infrared light having two or more emission intensities of the second light emitting unit but also an output voltage of the second light receiving unit.

The controller may be configured to measure the object reflectivity using the lookup table on the basis of a peak output voltage of the first light receiving unit in association with each emission of the infrared light having two or more emission intensities of the first light emitting unit or using an interpolation method based on the lookup table.

The controller may be configured to measure the distance to the object using the distance lookup table on the basis of an output voltage of the second light receiving unit in association with emission of the one intensity of infrared light of the second light emitting unit or using an interpolation method based on the distance lookup table.

The controller may be configured to measure the distance to the object using the distance lookup table on the basis of an output voltage of the second light receiving unit in association with emission of the infrared light having two or more emission intensities of the second light emitting unit or using an interpolation method based on the distance lookup table.

In accordance with another aspect of the present disclosure, an infrared sensor module includes a first infrared sensor that includes a first light emitting unit configured to emit an infrared light to an object and first and second light receiving units configured to detect an amount of the infrared light reflected from the object, and a controller to measure reflectivity of the object using a peak output voltage of the first light receiving unit, and to measure the distance to the object using the measured object reflectivity and an output voltage of the second light receiving unit.

The first light receiving unit may be arranged at the outside of the second light receiving unit.

The controller may control the first light emitting unit to alternately emit the infrared light having two or more emission intensities when measuring the object reflectivity.

The controller may control the first light emitting unit to emit the infrared light having two or more emission intensities when measuring the distance to the object.

In accordance with another aspect of the present disclosure, an infrared sensor module includes an infrared sensor that includes first and second light emitting units configured to emit an infrared light to an object and a first light receiving unit configured to detect an amount of the infrared light reflected from the object, and a controller to measure reflectivity of the object using a peak output voltage of the first light receiving unit in association with infrared light emission of the first light emitting unit, and to measure the distance to the object using the measured object reflectivity and an output voltage of the first light receiving unit in association with infrared light emission of the second light emitting unit.

The first light emitting unit may be arranged at the outside of the second light emitting unit.

The controller may control the first light emitting unit to alternately emit the infrared light having two or more emission intensities when measuring the object reflectivity.

The controller may control the second light emitting unit to emit the one intensity of infrared light when measuring the distance to the object.

The controller may control the second light emitting unit to emit the infrared light having two or more emission intensities when measuring the distance to the object.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a schematic diagram illustrating an arrangement of a light emitting unit and a light receiving unit in a conventional infrared sensor.

FIG. 2, parts (a) and (b), are circuit diagrams illustrating a light emitting unit and a light receiving unit contained in the conventional infrared sensor.

FIG. 3 is a graph illustrating a characteristic curve of an output voltage of the light receiving unit in response to both the distance from the infrared sensor to the object and object reflectivity.

FIG. 6, parts (a) and (b), are circuit diagrams illustrating a circuit for dualizing light emitting intensity of the first infrared sensor that constructs an infrared sensor module so as to measure reflectivity of an object according to an embodiment of the present disclosure.

FIG. 8, parts (a) and (b), are examples of a lookup table for measuring the object reflectivity.

FIG. 9, parts (a) and (b), are circuit diagrams illustrating a circuit for dualizing light emitting intensity of the second infrared sensor contained in an infrared sensor module so as to measure the distance from an infrared sensor to an object according to another embodiment of the present disclosure.

FIG. 10, parts (a) and (b), are examples of a distance lookup table for measuring the distance from an infrared sensor to an object.

DETAILED DESCRIPTION

Figure 4:
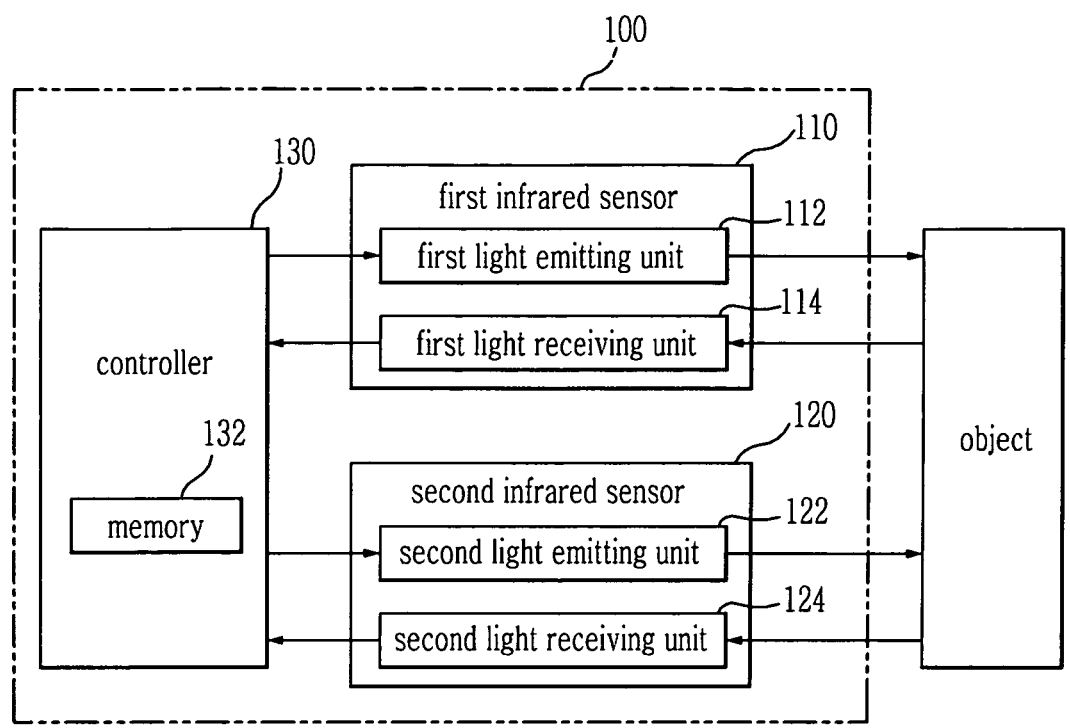
FIG. 4 is a control block diagram illustrating an infrared sensor module according to an embodiment of the present disclosure.

Reference will now be made in detail to the embodiments of the present disclosure, examples of which are illustrated in the accompanying drawings, wherein like reference numerals refer to like elements throughout.

FIG. 4 is a control block diagram illustrating an infrared sensor module according to an embodiment of the present disclosure.

Referring to FIG. 4, the infrared sensor module 100 according to an embodiment of the present disclosure includes a first infrared sensor 110, a second infrared sensor 120, and a controller 130.

The first infrared sensor 110 can measure the reflectivity of an object when the infrared sensors 110 and 120 approach the object or when the object approaches the infrared sensors 110 and 120. The first infrared sensor 110 includes a first light emitting unit 112 having a light emitting element (IRED) emitting infrared light, and a first light receiving unit 114 having a light receiving element (PTR or PD) detecting the amount of reflected light, and may also be composed of a combination of the first light emitting unit 112 and the first light receiving unit 114.

The second infrared sensor 120 can measure the distance from the infrared sensor 110 or 120 to the object by considering the object reflectivity measured through the first infrared sensor 110. The second infrared sensor 120 includes a second light emitting unit 122 having a light emitting element (IRED) emitting infrared light, and a second light receiving unit 124 having a light receiving element (PTR or PD) detecting the amount of reflected light, and may also be composed of a combination of the second light emitting unit 122 and the second light receiving unit 124.

The controller 130 measures the object reflectivity using a peak output voltage of the first light receiving unit 114, and measures the distance to the object using both an output voltage of the second light receiving unit 124 and the measured object reflectivity.

The controller 130 includes a memory 132 therein. The memory 132 stores a first lookup table for indicating reflectivity corresponding to a peak point (the peak output voltage) related to emission of infrared light that is used to measure object reflectivity, and also includes a second lookup table in response to not only reflectivity related to emission of infrared light that is used to measure the distance from an infrared sensor (110 or 120) to the object, but also an output voltage depending upon the distance from each infrared sensor to the object, etc.

A method for measuring the distance from each infrared sensor 110 or 120 to the object using the infrared sensor module 100 according to an embodiment of the present disclosure will hereinafter be described with reference to FIGS. 5 to 10.

The method for measuring the distance from the infrared sensor to the object in response to the amount of received light using the conventional infrared sensor composed of one light emitting element and one light receiving element has different reflected-light-amount characteristic curves (different received-light-amount characteristic curves) according to object reflectivity, such that accurately measuring the distance from the infrared sensor to the object is difficult, as previously stated above.

Therefore, if the infrared sensor 110 or 120 approaches the object or if the object approaches the infrared sensor 110 or 120, the infrared sensor module according to the present disclosure first measures reflectivity of an approaching object using the first infrared sensor 110, measures the distance from each infrared sensor 110 or 120 to the object using the second infrared sensor 120 on the basis of the object reflectivity measured through the first infrared sensor 110, such that the infrared sensor module can correctly measure the distance from each infrared sensor 110 or 120 to the object.

Figure 5:
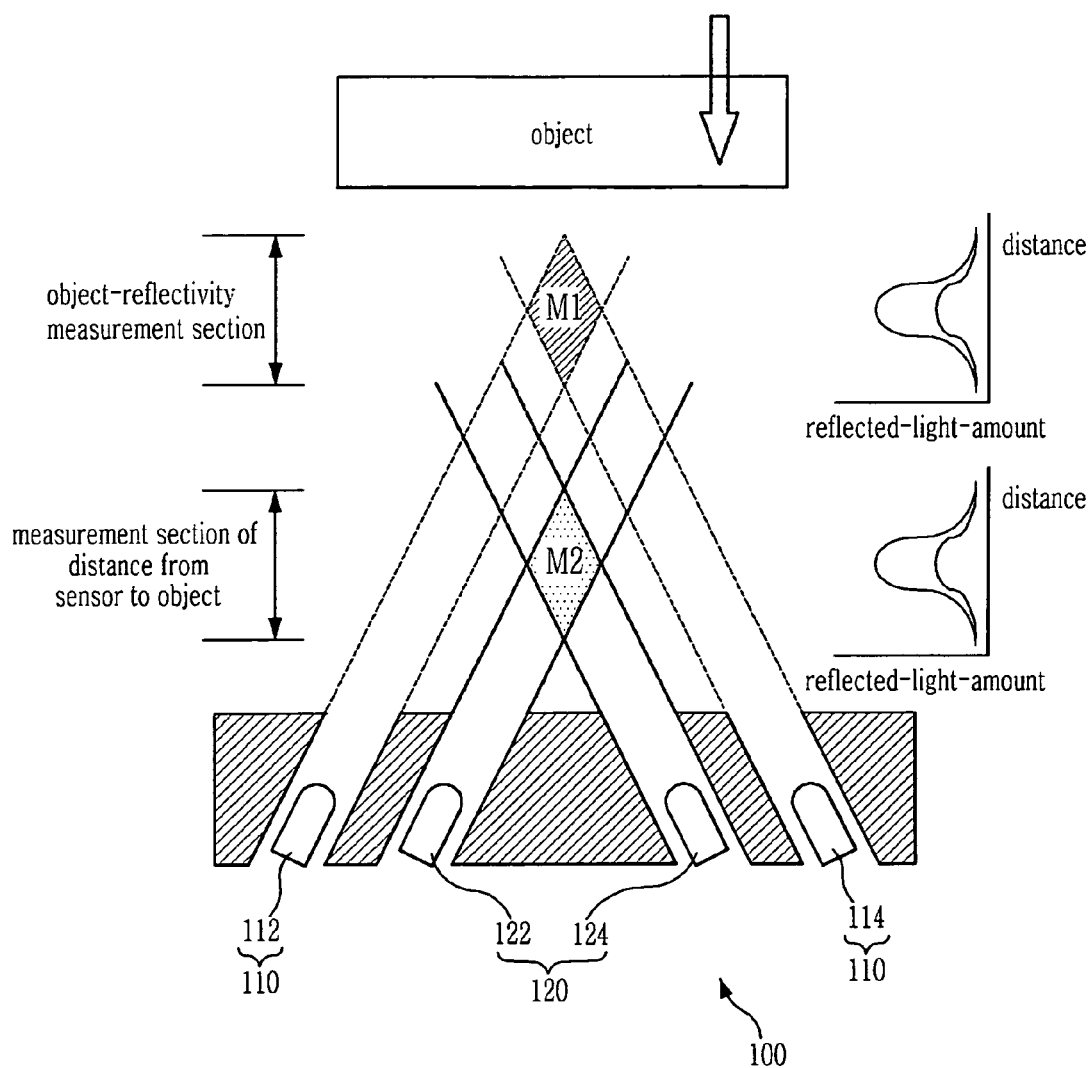
FIG. 5 is a schematic diagram illustrating an arrangement of a light emitting unit and a light receiving unit that are contained in each of a first infrared sensor, a second infrared sensor and an infrared sensor contained in an infrared sensor module according to an embodiment of the present disclosure.

FIG. 5 is a schematic diagram illustrating an arrangement of a light emitting unit and a light receiving unit that are contained in each of a first infrared sensor, a second infrared sensor and an infrared sensor contained in an infrared sensor module according to an embodiment of the present disclosure. The first light emitting unit 112 and the first light receiving unit 114 of the first infrared sensor 110 are arranged in such a manner that, when the infrared sensors 110 and 120 gradually approach the object or the object approaches the infrared sensors 110 and 120 and the distance from the infrared sensors 110 and 120 to the object passes through a center part (i.e., a horizontal diagonal point of an upper diamond shape shown in FIG. 5) of the reflectivity-measurement section M1 of a predetermined object, a characteristic curve of the reflected light amount (i.e., an output voltage of the first light receiving unit 114) obtained at the center part of the reflectivity-measurement section M1 reaches a peak point.

Herein, the reflectivity-measurement section M1 is established in such a manner that the robot cleaner, which desires to detect the object (obstacle) or to slowly move, includes a specific distance (e.g., 20 mm+10 mm=30 mm) spaced apart from the distance (e.g., 20 mm) from the infrared sensors 110 and 120 to the object by a first set distance (e.g., 10 mm). A distance spaced apart from the above specific distance by the first set distance is established in such a manner that a characteristic curve of the reflected light from among the reflectivity-measurement section M1 of the object has a peak point.

The second light emitting unit 122 and the second light receiving unit 124 of the second infrared sensor 120 are arranged in such a manner that, when the infrared sensors 110 and 120 gradually approach the object or the object approaches the infrared sensors 110 and 120 and the distance from the infrared sensors 110 and 120 to the object passes through a center part (i.e., a horizontal diagonal point of a lower diamond shape shown in FIG. 5) of a distance measurement section M2 between a predetermined infrared sensor and the object, a characteristic curve of the reflected light amount (i.e., an output voltage of the second light receiving unit 124) obtained at the center part of the distance measurement section M2 reaches a peak point.

Herein, the distance measurement section M2 is established in such a manner that the robot cleaner, which desires to detect the object (obstacle) or to slowly move, includes a specific distance (e.g., 20 mm) from the infrared sensors 110 and 120 to the object. A distance spaced apart from the above specific distance by the first set distance is established in such a manner that a characteristic curve of the reflected light from among the reflectivity-measurement section M1 of the object has a peak point, and this specific distance is located in the vicinity of a specific point where a characteristic curve of the reflected light amount from among the distance measurement section M2 between the infrared sensor and the distance reaches a peak point.

That is, when the distance from the infrared sensors 110 and 120 to the object is relatively long (when entering the reflectivity-measurement section of the object), the reflectivity of an initially approaching object is measured using the first infrared sensor 110 as shown in FIG. 5, and then, if the distance from the infrared sensors 110 and 120 to the object becomes relatively short because the infrared sensors 110 and 120 further approach the object or the object further approaches the infrared sensors 110 and 120, the distance from the infrared sensors 110 and 120 to the object is measured using the second infrared sensor 120. For this operation, the light emitting unit 112 and the light receiving unit 114 of the first infrared sensor 110 are arranged at the inside of the infrared sensor module, and the light emitting unit 122 and the light receiving unit 124 of the second infrared sensor 120 are arranged at the outside of the infrared sensor module.

A method for measuring the reflectivity of an approaching object will hereinafter be described in detail. If the infrared sensors 110 and 120 approach the object, or if the object approaches the infrared sensors 110 and 120, the above-mentioned reflectivity measurement method can find a peak point (i.e., a peak output voltage) of a characteristic curve of the amount of reflected light (i.e., an output voltage of the first light receiving unit 114) received through the first light receiving unit 114 after the infrared light emitted from the first light emitting unit 112 is reflected from the surface of the object when the distance from the infrared sensors 110 and 120 to the object, passes through the reflectivity-measurement section M1 of a predetermined object, thereby calculating the object reflectivity on the basis of the found result.

As can be seen from FIG. 3, the output voltage characteristic curve of the light receiving unit in response to the distance from the infrared sensor to the object in association with a high-reflectivity object (e.g., a white object) has a high output voltage distinction capability, such that a peak point of the output voltage characteristic curve can be easily found. In contrast, the output voltage characteristic curve of the light receiving unit in response to the distance from the infrared sensor to the object in association with a low-reflectivity object (e.g., a gray or black object) has a low output voltage distinction capability, such that it is difficult to find a peak point of the output voltage characteristic curve.

Therefore, according to embodiments of the present disclosure, a circuit for dualizing a light emitting intensity of the first light emitting unit 112 of the first infrared sensor 110 measuring the object reflectivity is configured to alternately emit two infrared light (i.e., a high intensity infrared light and a normal intensity infrared light), and a dualization circuit of the emitted light intensity of the first infrared sensor 110 is configured as shown in FIG. 6, parts (a) and (b). In order to measure reflectivity of a high-reflectivity object (reflectivity of 90%~18%), the first light emitting unit 112 emits an infrared light having normal intensity. In order to measure a low-reflectivity object (reflectivity of 18%~3%), the first light emitting unit 112 emits an infrared light having high intensity. Herein, the high intensity indicates light emission intensity under the condition that a current limitation resistor (OUT_R_LOW) is adjusted in such a manner that the output voltage of the first light receiving unit 114 has the magnitude having enough distinction capability in association with the object having reflectivity of 18% or lower (the object having reflectivity of 18%~3%). The normal intensity indicates light emission intensity under the condition that a current limitation resistor (OUT_R_HIGH) is adjusted in such a manner that the output voltage of the first light receiving unit 114 has the magnitude having enough distinction capability in association with the object having reflectivity of 90%~18%. In addition, the term "OUT" from among reference symbols indicating individual circuit elements indicates a circuit element that constructs a first infrared sensor 110 located at the outside of the second infrared sensor 120.

As can be seen from FIG. 6, part (a), the first light emitting unit 112 of the first infrared sensor 110 includes a light emitting element (OUT_IRED), a current limitation resistor (OUT_R_HIGH) for normal-intensity light emission, a normal-intensity control switching element (OUT_CTRL_NORMAL) for receiving a control signal for normal-intensity light emission of the light emitting element (OUT_IRED), a current limitation resistor (OUT_R_LOW) for high-intensity light emission, and a high-intensity control switching element (OUT_CTRL_STRONG) for receiving a control signal for high-intensity light emission of the light emitting element (OUT_IRED). Meanwhile, as shown in FIG. 6, part (b), the first light receiving unit 114 of the first infrared sensor 110 includes a light receiving element (OUT_PTR(NPN)), an output resistor (R3) and an output voltage terminal (V_OUT).

In order to enable the first emitting unit 112 to emit high-intensity infrared light, the controller 130 outputs a connection control signal to the high-intensity light emission control switching element (OUT_CTRL_STRONG), and outputs a cut-off control signal to the normal-intensity light emission control switching element (OUT_CTRL_NORMAL). Meanwhile, in order to enable the first light emitting unit 112 to emit normal-intensity infrared light, the controller 130 outputs a connection control signal to the normal-intensity light emission control switching element (OUT_CTRL_NORMAL), and outputs a cut-off control signal to the high-intensity light emission control switching element (OUT_CTRL_STRONG).

Figure 7A:
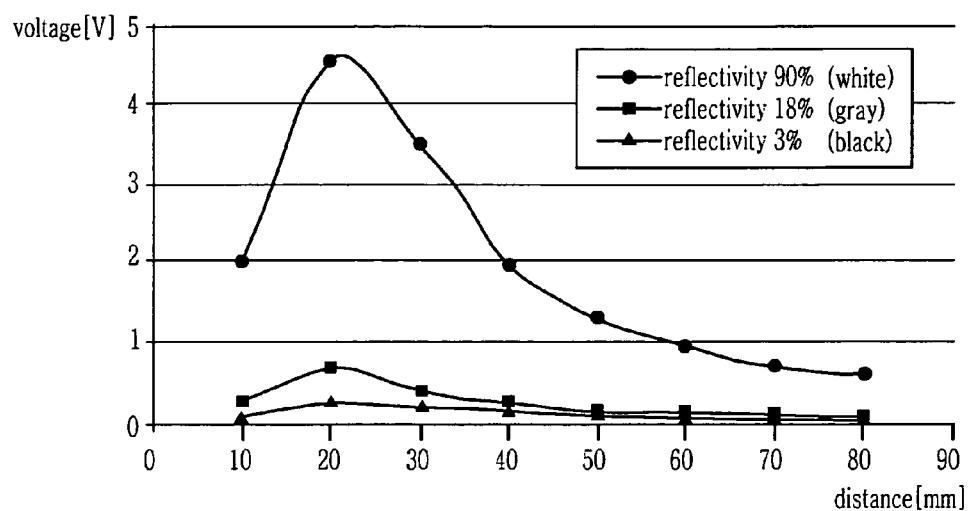
FIG. 7A is a graph illustrating a characteristic curve of an output voltage of the light receiving unit in response to not only reflectivity of each object but also the distance from the infrared sensor to the object under the condition that normal-intensity infrared light is emitted to measure the object reflectivity.

When emitting normal-intensity infrared light so as to measure the object reflectivity, the output voltage characteristic curve of the first light receiving unit 114 according to the distance from the infrared sensor to the object appears as shown in FIG. 7A. In this case, the output voltage distinction capability of the first light receiving unit 114 in association with the high-reflectivity object (e.g., a white object) is increased.

Figure 7B:
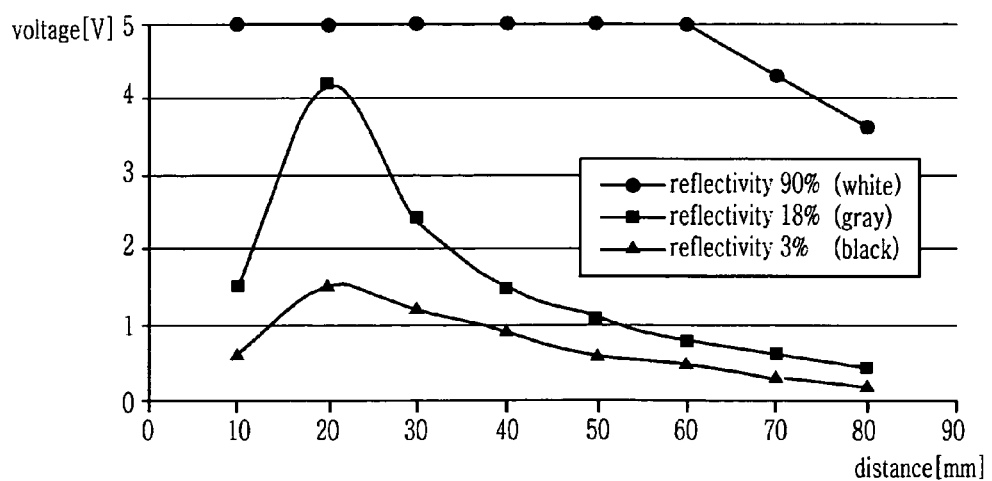
FIG. 7B is a graph illustrating a characteristic curve of an output voltage of the light receiving unit in response to not only reflectivity of each object but also the distance from the infrared sensor to the object under the condition that high-intensity infrared light is emitted to measure the object reflectivity.

In contrast, when outputting high-intensity infrared light to measure object reflectivity, the output voltage characteristic curve of the first light receiving unit 114 in response to the distance from the infrared sensor to the object appears as shown in FIG. 7B. In this case, the output voltage distinction capability of the first light receiving unit 114 in association with the low-reflectivity object (e.g., a low reflectivity object (e.g., gray or black object) becomes higher.

Nowadays, a large number of gray cards for implementing color balance and exposure adjustment of the camera have been widely spread and commercialized throughout the world. In generally, the gray card is formed of a material having reflectivity of 90%, 18%, or 3%.

In the case where the gray card is considered to be an approaching object and the robot cleaner having the infrared sensor module 100 performs the approach moving experiment, the output voltage characteristic curve for the object having reflectivity of 90%, 18% or 3% can be obtained from the first infrared sensor 110, and a first lookup table (See FIG. 8, part (a)) indicating reflectivity corresponding to a peak output voltage related to normal-intensity infrared emission and a second lookup table (See FIG. 8, part (b)) indicating reflectivity corresponding to a peak output voltage related to high-intensity infrared emission can be configured.

Therefore, when an object having arbitrary reflectivity approaches the robot cleaner, a peak point of the output voltage characteristic curve may be found and the configured lookup table may be used, or it is possible to estimate reflectivity of the approaching object using interpolation on the basis of the lookup table. In this case, the lookup table shown in FIG. 8, part (a), may be used to measure reflectivity (e.g., 90%~18%) of a high-reflectivity object, and the lookup table shown in FIG. 8, part (b), may be used to measure reflectivity (e.g., 18%~3%) of a low-reflectivity object.

The embodiments of the present disclosure have exemplarily described the method for calculating the object reflectivity by detecting a peak of the output voltage characteristic curve for convenience of description and better understanding of the present disclosure. However, if individual positions of the output resistor R3 and the light receiving element (OUT_PTR (NPN)) in the circuit configuration of the light receiving unit 114 shown in FIG. 6, part (b), are changed, the output voltage characteristic curve is reversed in shape, such that the embodiments of the present disclosure detect the lowest point (the lowest output voltage) of the output voltage characteristic curve so as to calculate the reflectivity of an object.

In addition, for convenience of description and better understanding of the present disclosure, the embodiments of the present disclosure have exemplarily described that the first light emitting unit 112 of the first infrared sensor 110 for measuring the object reflectivity emits two-intensities of infrared light (i.e., high-intensity infrared light and normal-intensity infrared light). However, if necessary, the infrared sensor module according to embodiments of the present disclosure may also emit an infrared light having three or more intensities, such that the accuracy of the object reflectivity measurement can be further increased.

A method for measuring the distance from the infrared sensors 110 and 120 to the object on the basis of reflectivity of an approaching object will hereinafter be described in detail.

The method for measuring the distance from the infrared sensor to the object is proposed on the assumption of the above-mentioned reflectivity measurement method. That is, after measuring the object reflectivity using the first infrared sensor 110, the infrared sensor module according to the present disclosure measures the distance from the infrared sensors 110 and 120 to the object using the second infrared sensor 120. The second infrared sensor 120 for measuring the distance from the infrared sensors 110 and 120 to the object may include either a circuit for implementing one light emission intensity or a light emission intensity dualization circuit in consideration of the configuration of the infrared sensors 110 and 120 and the characteristics of the reflected light amount (the received light amount). When emitting one intensity of infrared light, the second infrared sensor 120 may be configured as shown in FIG. 2. When emitting two intensities of infrared light (i.e., high-intensity infrared light and normal-intensity infrared light), the second infrared sensor 120 may be configured as shown in FIG. 9, parts (a) and (b).

As can be seen from FIG. 9, part (a), the second light emitting unit 122 of the second infrared sensor 120 includes a light emitting element (IN_IRED), a current limitation resistor (IN_R_HIGH) for normal-intensity light emission, a normal-intensity light emission control switching element (IN_CTRL_NORMAL) for receiving a control signal for normal-intensity light emission of the light emitting element (IN_IRED), a current limitation resistor (IN_R_LOW) for high-intensity light emission, and a high-intensity light emission control switching element (IN_CTRL_STRONG) for receiving a control signal for high-intensity light emission of the light emitting element (IN_IRED). Meanwhile, as shown in FIG. 9, part (b), the second light receiving unit 124 of the second infrared sensor 120 includes a light receiving element (IN_PTR(NPN)), an output resistor (R4) and an output voltage terminal (V_OUT). In addition, the term "IN" from among reference symbols indicating individual circuit elements indicates a circuit element that constructs the second infrared sensor 120 located at the interior of the first infrared sensor 110.

In order to enable the second emitting unit 122 to emit high-intensity infrared light, the controller 130 outputs a connection control signal to the high-intensity light emission control switching element (IN_CTRL_STRONG), and outputs a cut-off control signal to the normal-intensity light emission control switching element (IN_CTRL_NORMAL). Meanwhile, in order to enable the second light emitting unit 122 to emit normal-intensity infrared light, the controller 130 outputs a connection control signal to the normal-intensity light emission control switching element (IN_CTRL_NORMAL), and outputs a cut-off control signal to the high-intensity light emission control switching element (IN_CTRL_STRONG).

For convenience of description and better understanding of the present disclosure, the embodiments of the present disclosure have exemplarily described that the first light emitting unit 122 of the second infrared sensor 120 for measuring the distance from the infrared sensors 110 and 120 to the object emits two intensities of infrared light (i.e., high-intensity infrared light and normal-intensity infrared light). However, if necessary, the infrared sensor module according to embodiments of the present disclosure may also emit infrared light having three or more intensities, such that accuracy in measuring the distance from the infrared sensors 110 and 120 to the object can be further increased.

As described above, through the approaching moving experiment using the gray card, the output voltage characteristic curve for the object having reflectivity of 90%, 18% or 3% of the second infrared sensor 120 can be obtained.

In the case where the gray card is considered to be an approaching object and the robot cleaner having the second infrared sensor 120 performs the approach moving experiment, the output voltage characteristic curve for the object having reflectivity of 90%, 18% or 3% can be obtained from the second infrared sensor 120, and a first distance lookup table (See FIG. 10, part (a)) depending upon reflectivity and output voltage (in relation to the distance to the object) in association with normal-intensity infrared emission and a second lookup table (See FIG. 10, part (b)) depending upon reflectivity and output voltage (in relation to the distance to the object) in association with the high-intensity infrared emission can be configured.

As a result, it is possible to estimate the distance from the infrared sensors 110 and 120 to the object using the distance lookup table or the interpolation method, wherein the distance lookup table is configured on the basis of not only the object reflectivity obtained through the reflectivity measurement process but also the second light unit 124's output voltage obtained from the distance measurement section M2 between the infrared sensor 110 or 120 and the object. Herein, in the case of measuring the distance between the infrared sensor 110 or 120 and the object by emitting single-intensity infrared light, the distance lookup table (used when normal-intensity infrared light is emitted) shown in FIG. 10, part (a) or the other distance lookup table (used when high-intensity infrared light is emitted) shown in FIG. 10, part (b) may be used as necessary. In addition, when measuring the distance from the infrared sensor 110 or 120 to the object by emitting two intensities of infrared light, the distance lookup table shown in FIG. 10, part (a), may be used to measure the distance from the infrared sensor 110 or 120 to the object in association with a high reflectivity object (e.g., object having reflectivity of 90%~18%), and the other distance lookup table shown in FIG. 10, part (b), may be used to measure the distance from the infrared sensor 110 or 120 to the object in association with a low reflectivity object (e.g., an object having a reflectivity of 18%~3%).

A distance measurement method using the infrared sensor module according to embodiments of the present disclosure will hereinafter be described with reference to FIG. 11.

The embodiments of the present disclosure provide a method for measuring the distance from the infrared sensor 110 or 120 to the object under the condition that infrared light having one intensity (e.g., high intensity or normal intensity) is emitted from the distance measurement section M2 between the infrared sensor 110 or 120 to the object.

As an initial condition for description of operations of the embodiments of the present disclosure, it is assumed that the memory 132 of the controller 130 includes a lookup table for indicating reflectivity corresponding to a peak output voltage related to infrared emission used for measuring object reflectivity, and a distance lookup table depending upon not only reflectivity of infrared emission used for measuring the distance from the infrared sensor 110 or 120 to the object but also an output voltage (related to the distance to the object) associated with the reflectivity.

For convenience of description, a parameter for indicating an output voltage of the first light receiving unit 114 of the first infrared sensor 110 is denoted by 'V1', and a parameter for indicating an output voltage of the second light receiving unit 114 of the second infrared sensor 114 is denoted by 'V2'. In addition, in the case where the first light emitting unit 112 outputs high-intensity infrared light, it is assumed that a parameter for indicating the peak output voltage of the first light receiving unit 114 is denoted by 'V1_STRONG_HIGHEST', and a parameter for indicating a current output voltage of the first light receiving unit 114 is denoted by 'V1_STRONG_CURRENT'. In addition, when the first light emitting unit 112 emits the normal-intensity infrared light, a parameter for indicating the peak output voltage of the first light receiving unit 114 is denoted by 'V1_NORMAL_HIGHEST', and a parameter for indicating a current output voltage of the first light receiving unit 114 is denoted by 'V1_NORMAL_CURRENT'.

First, the controller 130 alternately transmits a connection control signal to the high-intensity light emission control switching element (OUT_CTRL_STRONG) and the normal-intensity light emission control switching element (OUT_CTRL_NORMAL) of the first light emitting unit 112, such that the high-intensity infrared light and the normal-intensity infrared light are alternately applied to the object. Thereafter, the controller 130 determines whether a value stored in the 'V1_STRONG_CURRENT' parameter or a value stored in the 'V1_NORMAL_CURRENT' parameter is very close to zero '0' at operation 202.

If the value stored in the 'V1_STRONG_CURRENT' parameter or the value stored in the 'V1_NORMAL_CURRENT' parameter are very close to zero '0' at operation 202, the controller 130 determines that the object is very far from the infrared sensors 110 and 120, determines that the object has disappeared, or determines that the robot cleaner including the infrared sensors 110 and 120 has been kidnapped, such that all parameters are initialized (i.e., V1_STRONG_HIGHEST=0, V1_STRONG_CURRENT=0, V1_NORMAL_HIGHEST=0, V1_NORMAL_CURRENT=0) at operation 204, and returns to operation 202.

Meanwhile, if the value stored in the 'V1_STRONG_CURRENT' parameter or the value stored in the 'V1_NORMAL_CURRENT' parameter are not very close to zero '0' at operation 202, the controller 130 determines that the infrared sensors 110 and 120 approach the object or determines that the object approaches the infrared sensors 110 and 120, transmits a connection control signal to the high-intensity light emission control switching element (OUT_CTRL_STRONG) of the first light emitting unit 112, such that the first light emitting unit 112 can emit the high-intensity infrared light at operation 206.

Thereafter, the controller 130 stores the output voltage received through the first light receiving unit 114 in the V1_STRONG_CURRENT parameter at operation 208.

In order to alternately emit the high-intensity infrared light and the normal-intensity infrared light to the object, the controller 130 transmits a connection control signal to the normal-intensity light emission control switching element (OUT_CTRL_NORMAL) of the first light emitting unit 112, such that the first light emitting unit 112 can emit the normal-intensity infrared light at operation 210.

Thereafter, the controller 130 stores an output voltage received through the first light receiving unit 114 in the V1_NORMAL_CURRENT parameter at operation 212.

Next, the controller 130 determines whether the value stored in the V1_STRONG_CURRENT parameter was saturated at operation 214.

If the value stored in the V1_STRONG_CURRENT parameter was saturated at operation 214, the controller 130 determines that the approaching object is the high reflectivity object (e.g., white object), and determines whether the value stored in the V1_NORMAL_CURRENT parameter is higher than the value stored in the V1_NORMAL_HIGHEST parameter at operation 216.

If the value stored in the V1_NORMAL_CURRENT parameter is higher than the value stored in the V1_NORMAL_HIGHEST parameter at operation 216, the value stored in the V1_NORMAL_CURRENT parameter is stored as the V1_NORMAL_HIGHEST parameter so that the highest voltage value is updated at operation 218. Then, the controller returns to operation 206, such that the high-intensity infrared light and the normal-intensity infrared light can be continuously and alternately emitted to the object.

Meanwhile, if the value stored in the V1_NORMAL_CURRENT parameter is not higher than the value stored in the V1_NORMAL_HIGHEST parameter at operation 216, the controller 130 determines whether the resultant value obtained when the value stored in the V1_NORMAL_CURRENT parameter is deducted from the value stored in the V1_NORMAL_HIGHEST parameter is higher than a predetermined set value at operation 220.

If the resultant value obtained when the value stored in the V1_NORMAL_CURRENT parameter is deducted from the value stored in the V1_NORMAL_HIGHEST parameter is not higher than a predetermined set value at operation 220, the controller 130 returns to operation 206 such that it can continue to alternately emit the high-intensity infrared light and the normal-intensity infrared light to the object.

On the other hand, if the resultant value obtained when the value stored in the V1_NORMAL_CURRNET parameter is deducted from the value stored in the V1_NORMAL_HIGHEST parameter is higher than the predetermined set value at operation 220, the controller 130 determines that the output voltage characteristic curve of the first light receiving unit 114 in association with emission of the normal-intensity infrared light of the first light emitting unit 112 passes through a peak output voltage of the first light receiving unit 114 and is currently located at a descending point, and uses a reflectivity lookup table (See FIG. 8, part (a)) associated with emission of normal-intensity infrared light on the basis of the value stored in the V1_NORMAL_HIGHEST parameter or measures the reflectivity of an approaching object using the interpolation based on the lookup table at operation 222.

Referring back to operation 214, if the value stored in the V1_STRONG-CURRENT parameter is not saturated, the controller 130 determines that the approaching object is an object having relatively low-reflectivity (e.g., gray or black object), and determines whether the value stored in the V1_STRONG_CURRENT parameter is higher than the value stored in the V1_STRONG_HIGHESTparameter at operation 224.

If the value stored in the V1_STRONG_CURRENT parameter is higher than the value stored in the V1_STRONG_HIGHEST at operation 224, the controller 130 stores the value stored in the V1_STRONG_CURRENT parameter as a value of the V1_STRONG_HIGHEST parameter so as to update a highest voltage value at operation 226. Then, the controller 130 returns to operation 206 such that it can continuously and alternately emit the high-intensity infrared light and the normal-intensity infrared light to the object.

Meanwhile, if the value of the V1_STRONG_CURRENT parameter is not higher than the value of the V1_STRONG_HIGHEST parameter at operation 224, the controller 130 determines whether the resultant value obtained when the value stored in the V1_STRONG_CURRENT parameter is deducted from the value stored in the V1_STRONG_HIGHEST parameter is higher than a predetermined set value at operation 228.

If the resultant value obtained when the value stored in the V1_NORMAL_CURRENT parameter is deducted from the value stored in the V1_NORMAL_HIGHEST parameter is not higher than a predetermined set value at operation 228, the controller 130 returns to operation 206 such that it continuously and alternately emits the high-intensity infrared light and the normal-intensity infrared light to the object.

On the other hand, if the resultant value obtained when the value stored in the V1_STRONG_CURRNET parameter is deducted from the value stored in the V1_STRONG_HIGHEST parameter is higher than the predetermined set value at operation 228, the controller 130 determines that the output voltage characteristic curve of the first light receiving unit 114 in association with emission of the normal-intensity infrared light of the first light emitting unit 112 passes'through a peak output voltage of the first light receiving unit 114 and is currently located at a descending point, and uses a reflectivity lookup table (See FIG. 8, part (b)) associated with emission of high-intensity infrared light on the basis of the value stored in the V1_STRONG _HIGHEST parameter or measures the reflectivity of an approaching object using the interpolation based on the lookup table at operation 230.

In order to measure the distance from the infrared sensor 110 or 120 to the object on the basis of the object reflectivity measured through operations 202 to 230, the controller 130 transmits a connection control signal to the light emission control switching element (IN_CTRL_ON_OFF) of the second light emitting unit 122, such that the second light emitting unit 122 can emit one intensity of infrared light (generally, normal-intensity infrared light or strong-intensity infrared light) at operation 232.

Thereafter, the controller 130 receives an output voltage V2 associated with the normal-intensity infrared light or the high-intensity infrared light from the second light receiving unit 124 at operation 234.

Next, the controller 130 measures the distance from the infrared sensor 110 or 120 to the object using any one of a first lookup table (See FIG. 10, part (a)), a distance lookup table (See FIG. 10, part (b)), or an interpolation method based on these lookup tables. In this case, the first lookup table is based on the reflectivity and output voltage in relation to emission of the normal-intensity infrared light on the basis of the output voltage V2 of the second light receiving unit 124, and the distance lookup table is based on the reflectivity and output voltage in relation to emission of the high-intensity infrared light on the basis of the output voltage V2 of the second light receiving unit 124 (Operation 236).

Figure 12:
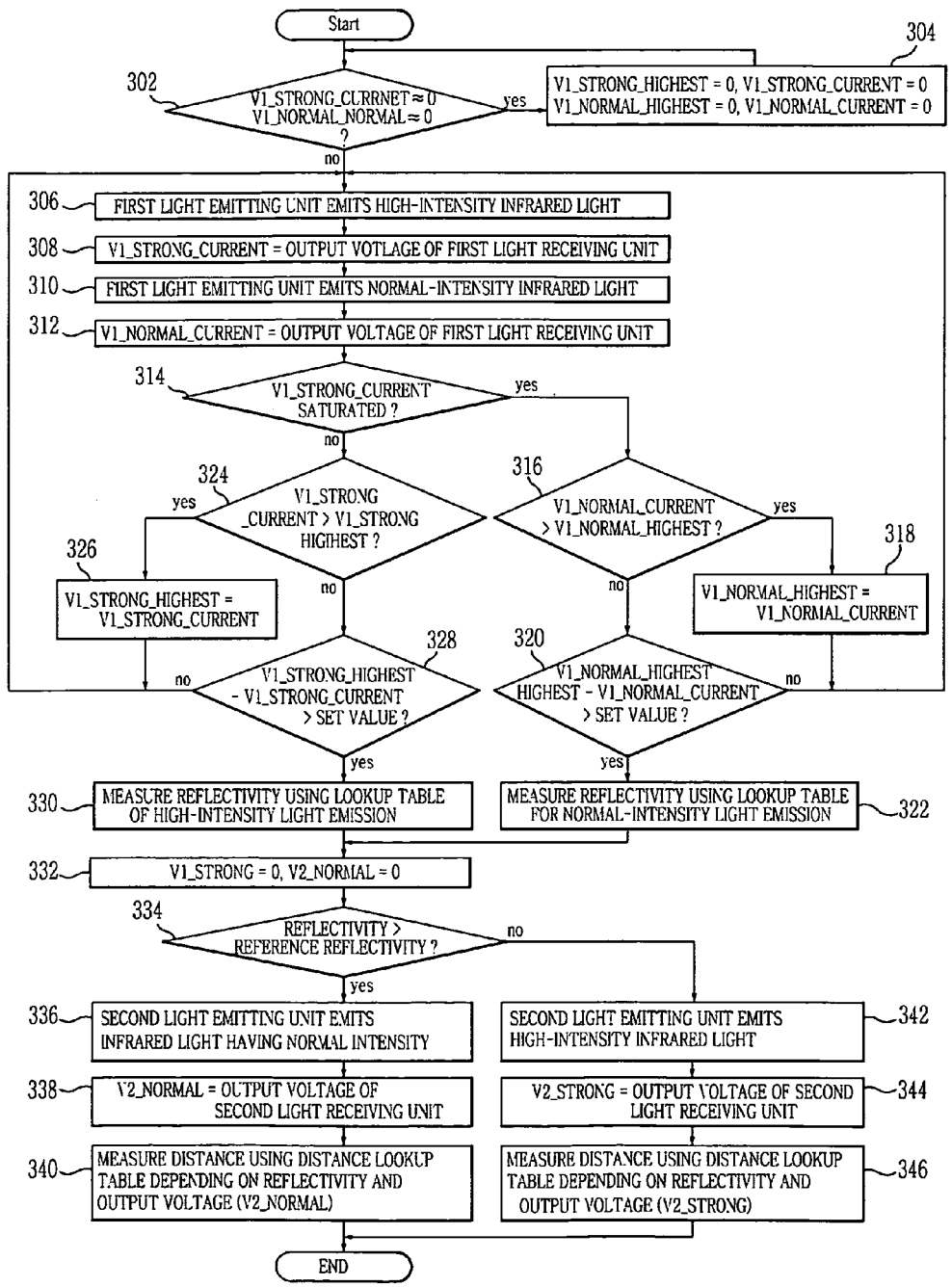
FIG. 12 is a flowchart illustrating another distance measurement method using an infrared sensor module according to another embodiment of the present disclosure.

Hereinafter, a distance measurement method using an infrared sensor module according to another embodiment of the present disclosure will be described with reference to FIG. 12.

Another embodiment of the present disclosure provides a method for measuring the distance from the infrared sensor 110 or 120 to the object when two intensities of infrared light (i.e., the high-intensity infrared light and the normal-intensity infrared light) are emitted from the distance measurement section M2 between each infrared sensor 110 or 120 and the object.

For convenience of description and better understanding of the present disclosure, it is assumed that a parameter indicating an output voltage of the second light receiving unit 124 when the second light emitting unit 122 emits high-intensity infrared light is denoted by 'V2_STRONG', and a parameter indicating an output voltage of the second light receiving unit 124 when the second light emitting unit 122 emits the normal-intensity infrared light is denoted by 'V2_NORMAL'.

Figure 11:
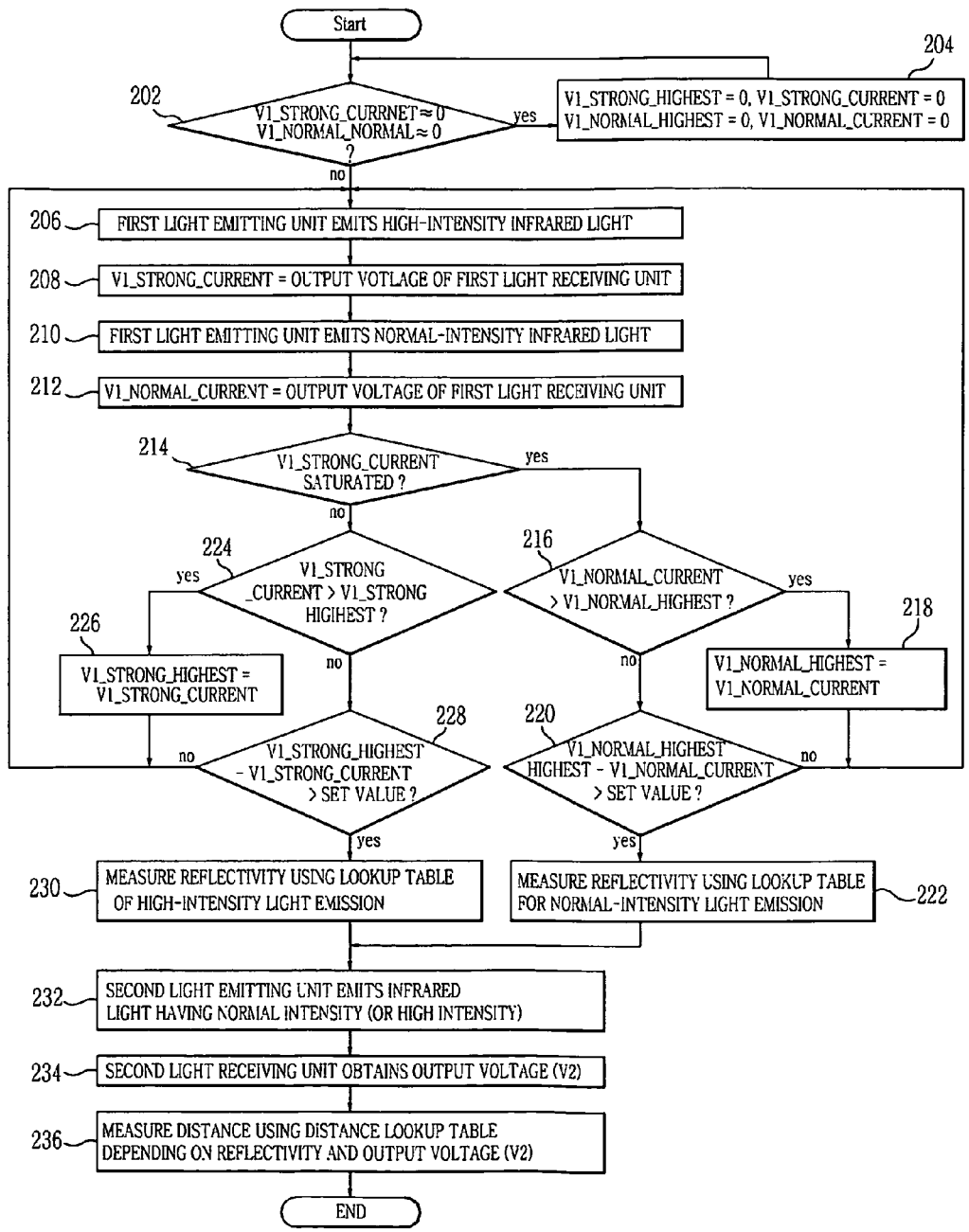
FIG. 11 is a flowchart illustrating a distance measurement method using an infrared sensor module according to an embodiment of the present disclosure.

Operations 302 to 330 to measure the reflectivity of the approaching object are identical to operations 202 to 230 of FIG. 11, and as such a detailed description thereof will be omitted herein for convenience of description.

In order to measure the distance from the infrared sensor 110 or 120 to the object on the basis of the object reflectivity measured through operations 302 to 330, the controller 130 initializes parameters (V2_STRONG=0, V2_NORMAL=0) (Operation 332).

Thereafter, the controller 130 determines whether the object reflectivity measured through operations 302 to 330 is higher than reference reflectivity (e.g., 18%) at operation 334.

If the measured object reflectivity is higher than the reference reflectivity (e.g., 18%) at operation 334, the controller 130 determines that the approaching object is a high reflectivity object (e.g., white object), and outputs a connection control signal to the normal-intensity light emission control switching element (IN_CTRL_NORMAL) of the second light emitting unit 112, such that the second light emitting unit 122 can transmit the normal-intensity infrared light at operation 336.

Next, the controller 130 stores the output voltage received from the second light receiving unit 24 in the V2_NORMAL parameter at operation 338.

Thereafter, the controller 130 measures the distance from the infrared sensor 110 or 120 to the object using a distance lookup table (See FIG. 10(*a*)) or the interpolation method based on the distance lookup table on the basis of the value stored in the V2_NORMAL parameter at operation 340. In this case, the distance lookup table is configured based on the reflectivity and output voltage associated with emission of the normal-intensity infrared light.

Referring back to operation 334, if the measured object reflectivity is not higher than the reference reflectivity (e.g., 185) at operation 334, the controller 130 determines that the approaching object is a low-reflectivity object (e.g., a gray or black object), and outputs a connection control signal to the high-intensity light emission control switching unit (IN_CTRL_STRONG) of the second light emitting unit 122, such that it controls the second light emitting unit 122 to emit the high-intensity infrared light at operation 342.

Next, the controller 130 stores the output voltage received through the second light receiving unit 124 in the V2_STRONG parameter at operation 344.

After that, the controller 130 measures the distance from the infrared sensor 110 or 120 to the object using a distance lookup table (See FIG. 10, part (b)) on the basis of the value of the V2_STRONG parameter or using the interpolation method based on the distance lookup table at operation 346, wherein the distance lookup table is based on the reflectivity and output voltage associated with emission of the high-intensity infrared light.

Figure 13:
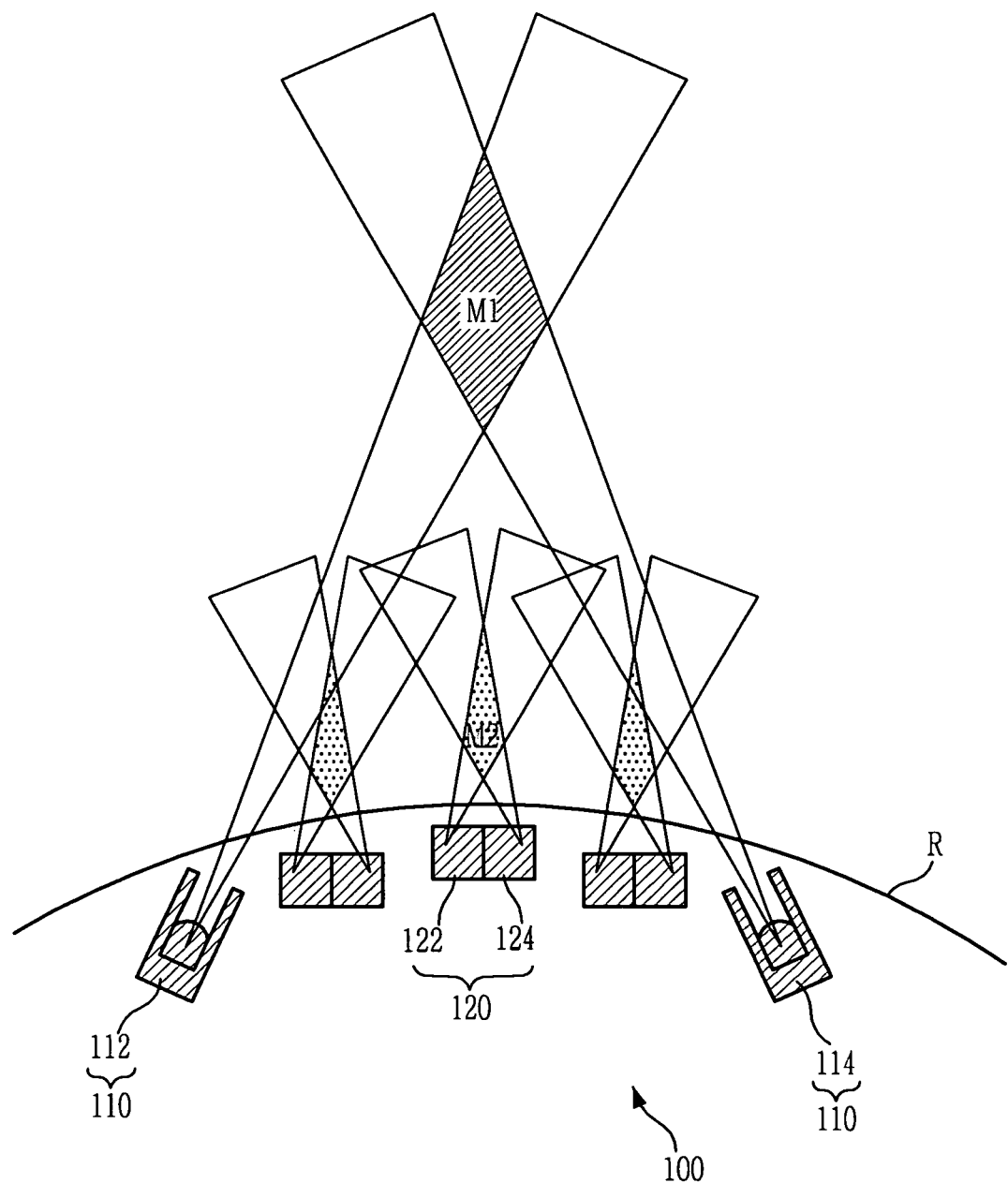
FIG. 13 is a conceptual diagram illustrating infrared sensor modules mounted to a robot cleaner according to an embodiment of the present disclosure.

FIG. 13 is a conceptual diagram illustrating the infrared sensor module 100 is mounted to a robot cleaner R according to an embodiment of the present disclosure. In the arrangement of the infrared sensor module 100 shown in FIG. 13, after the reflectivity of an approaching object in the object-reflectivity measurement section M1 is measured, the distance from the infrared sensor 110 or 120 to the object is measured in the distance measurement section M2 between each infrared sensor 110 or 120 and the object on the basis of the measured reflectivity, using the output voltage of the second light receiving unit 124 of each of three second infrared sensors 120.

Figure 14:
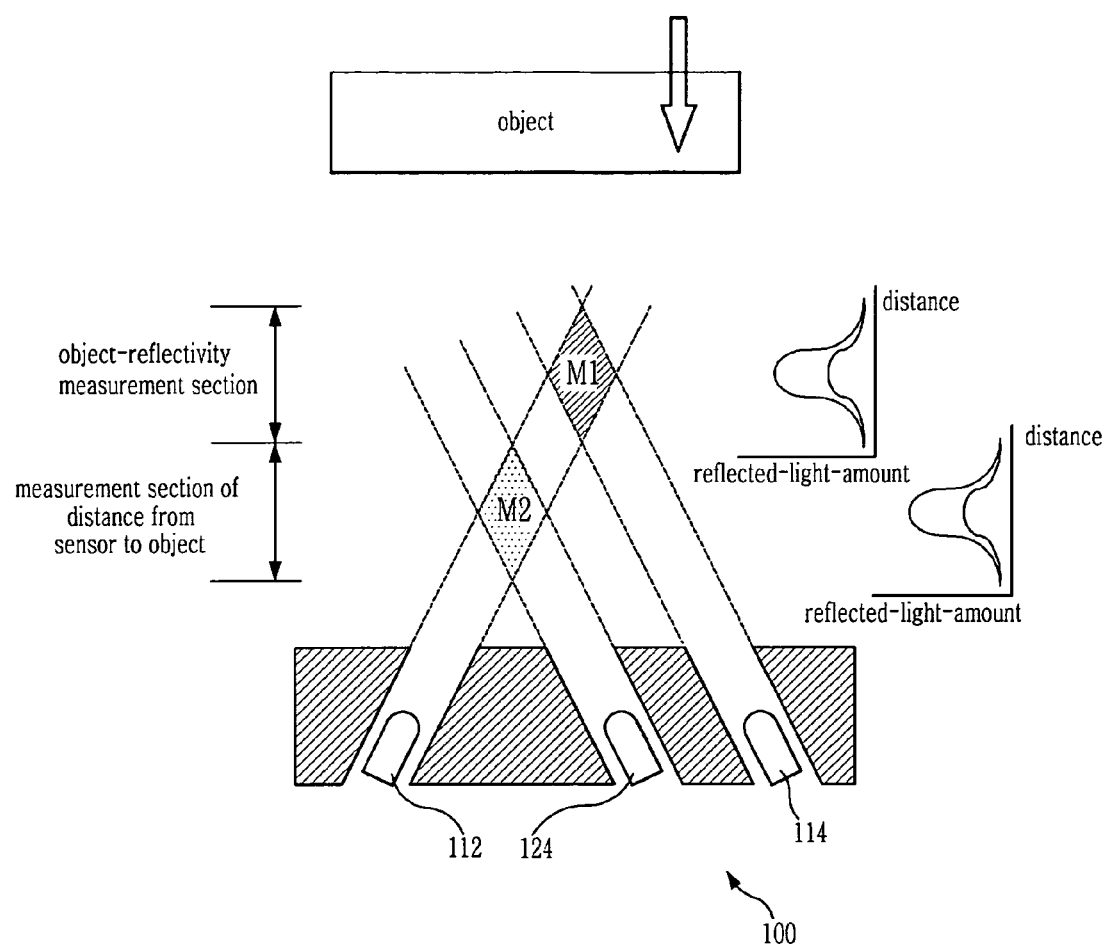
FIG. 14 is a schematic diagram illustrating an arrangement of a light emitting unit and a light receiving unit that are contained in an infrared sensor constructing an infrared sensor module according to another embodiment of the present disclosure.

As can be seen from the above-mentioned description, the object reflectivity is measured using the first infrared sensor 110 composed of the first light emitting unit 112 and the first light receiving unit 114, and the distance from the infrared sensor 110 or 120 to the object is measured using the second infrared sensor 120 composed of the first light emitting unit 122 and the second light receiving unit 124 (i.e., two light emitting units and two light receiving units are used). However, the infrared sensor shown in FIG. 14 includes a combination of one light emitting unit (the first light emitting unit 112) for emitting infrared light to the object and two light receiving units (i.e., the first light receiving unit 114 and the second light receiving unit 124) each detecting the amount of infrared light reflected from the object. In addition, the object reflectivity may be measured using the peak output voltage of the first light receiving unit 114, and the distance from the infrared sensor 110 or 120 to the object may be measured using the output voltage of the second light receiving unit 124 and the measured object reflectivity (i.e., one light emitting unit and two light receiving units are used). In this case, when the distance from the infrared sensor to the object is relatively long (when entering the object reflectivity measurement section), after the reflectivity of an approaching object is first measured using the peak output voltage of the first light receiving unit 114 in association with the emission of infrared light of the first light emitting unit 112, if the infrared sensor further approaches the object or the object further approaches the infrared sensor so that the distance from the infrared sensor to the object is reduced (when entering the section for measuring the distance from the sensor to the object), the distance from each infrared sensor to the object is measured using the output voltage of the second light receiving unit 124 in association with emission of the infrared light of the first light emitting unit 112. For this operation, as shown in FIG. 14, the first light receiving unit 114 is arranged at the outside of the infrared sensor module 100, and the second light receiving unit 124 is arranged at the inside of the infrared sensor module 100.

Figure 15:
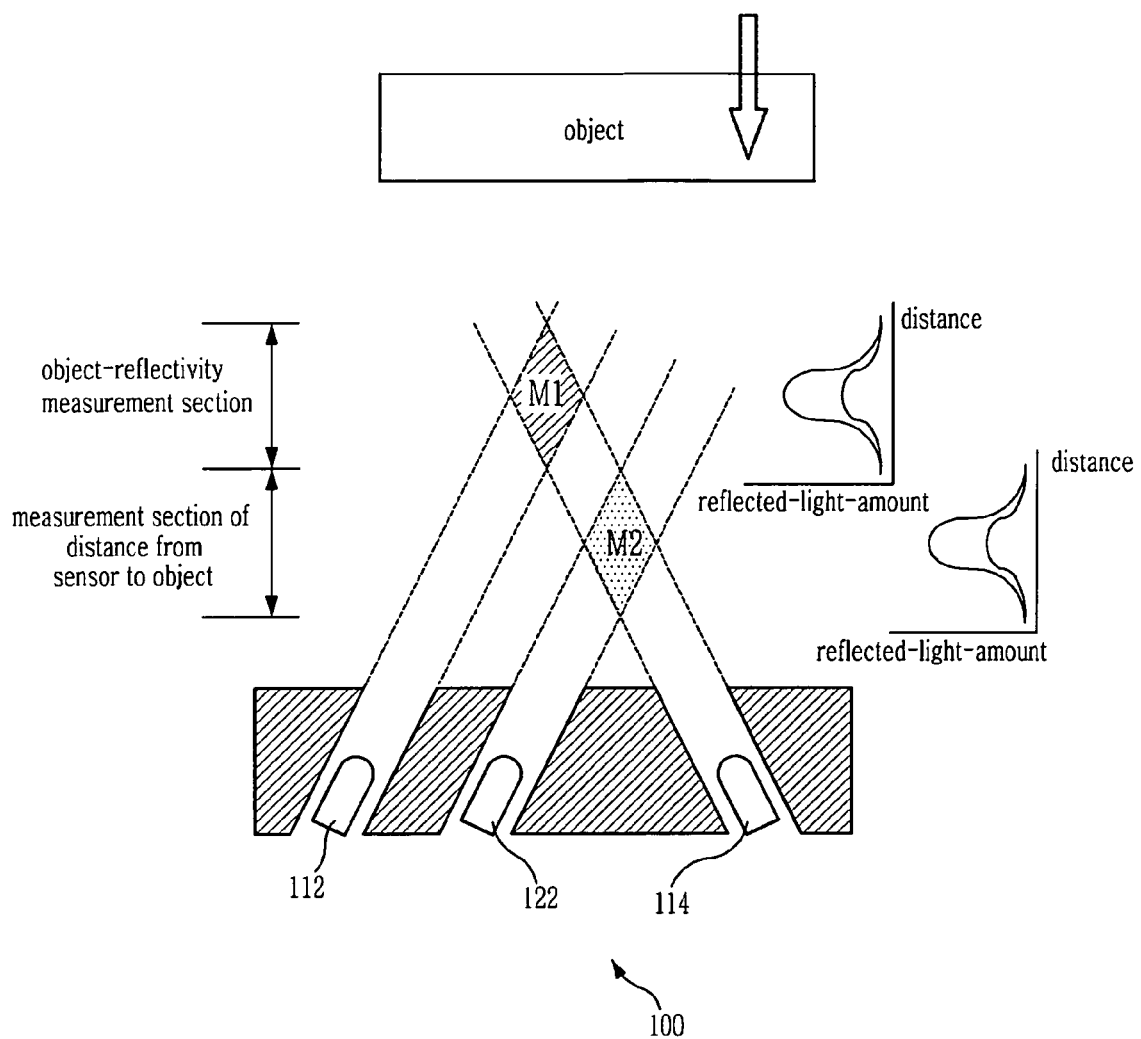
FIG. 15 is a schematic diagram illustrating an arrangement of a light emitting unit and a light receiving unit that are contained in an infrared sensor constructing an infrared sensor module according to still another embodiment of the present disclosure.

As shown in FIG. 15, the infrared sensor module includes a combination of two light emitting units (i.e., the first light emitting unit 112 and the second light emitting unit 122) for emitting infrared light to the object and one light receiving unit (i.e., the first light receiving unit 114) for detecting the amount of infrared light reflected from the object. In addition, the object reflectivity may be measured using the peak output voltage of the first light receiving unit 114 in association with emission of infrared light of the first light emitting unit 112, and the distance from the infrared sensor to the object may be measured using the measured object reflectivity and the output voltage of the first light receiving unit 114 in relation to emission of infrared light of the second light emitting unit 112 (i.e., two light emitting units and one light receiving unit are used). In this case, when the distance from the infrared sensor to the object is relatively long (when entering the object reflectivity measurement section), after the reflectivity of an approaching object is first measured using the peak output voltage of the first light receiving unit 114 in association with emission of infrared light by the first light emitting unit 112, if the infrared sensor further approaches the object or the object further approaches the infrared sensor so that the distance from the infrared sensor to the object is relatively reduced (when entering the section for measuring the distance from the sensor to the object), the distance from each infrared sensor to the object is measured using the output voltage of the first light receiving unit 114 in association with emission of the infrared light of the second light emitting unit 122. For this operation, as shown in FIG. 15, the first light emitting unit 112 is arranged at the outside of the infrared sensor module 100, and the second light emitting unit 122 is arranged at the inside of the infrared sensor module 100.

As is apparent from the above description, the infrared sensor module according to embodiments of the present disclosure can correctly measure the distance from the infrared sensor module to the object irrespective of object reflectivity, using a two-step measurement scheme in which the infrared sensor module measures reflectivity of the approaching object and then measures the distance from the infrared sensor to the object on the basis of the measured reflectivity.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. An infrared sensor module comprising:
    a first infrared sensor that includes a first light emitting unit configured to emit infrared light to an object and a first light receiving unit configured to detect an amount of an infrared light reflected from the object;
    a second infrared sensor that includes a second light emitting unit configured to emit infrared light to the object and a second light receiving unit configured to detect an amount of the infrared light reflected from the object; and
    a controller to measure reflectivity of the object using a peak output voltage of the first light receiving unit, and to measure a distance to the object using not only the measured object reflectivity but also an output voltage of the second light receiving unit.

2. The infrared sensor module according to claim 1, wherein the first infrared sensor is arranged at the outside of the second infrared sensor.

3. The infrared sensor module according to claim 1, wherein the controller controls the first light emitting unit to alternately emit infrared light having two or more emission strengths when measuring the object reflectivity.

4. The infrared sensor module according to claim 3, wherein the controller controls the second light emitting unit to emit one strength of infrared light when measuring the distance to the object.

5. The infrared sensor module according to claim 4, further comprising:
    a memory to store not only a lookup table that indicates reflectivity corresponding to a peak output voltage of the first light receiving unit in association with emission of the infrared light having two or more emission strengths of the first light emitting unit, but also a distance lookup table that depends upon not only the reflectivity associated with emission of one-strength infrared light of the second light emitting unit but also an output voltage of the second light receiving unit.

6. The infrared sensor module according to claim 5, wherein the controller is configured to measure the object reflectivity using the lookup table on the basis of a peak output voltage of the first light receiving unit in association with emission of the infrared light having two or more emission strengths of the first light emitting unit or using an interpolation method based on the lookup table.

7. The infrared sensor module according to claim 5, wherein the controller is configured to measure the distance to the object using the distance lookup table on the basis of an output voltage of the second light receiving unit in association with emission of the one-strength infrared light of the second light emitting unit or using an interpolation method based on the distance lookup table.

8. The infrared sensor module according to claim 3, wherein the controller controls the second light emitting unit to emit infrared light having two or more emission strengths when measuring the distance to the object.

9. The infrared sensor module according to claim 8, further comprising:
    a memory to store not only a lookup table that indicates reflectivity corresponding to a peak output voltage of the first light receiving unit in association with emission of the infrared light having two or more emission strengths of the first light emitting unit, but also a distance lookup table that depends upon not only the reflectivity associated with emission of the infrared light having two or more emission strengths of the second light emitting unit but also an output voltage of the second light receiving unit.

10. The infrared sensor module according to claim 9, wherein the controller is configured to measure the object reflectivity using the lookup table on the basis of a peak output voltage of the first light receiving unit in association with emission of the infrared light having two or more emission strengths of the first light emitting unit or using an interpolation method based on the lookup table.

11. The infrared sensor module according to claim 9, wherein the controller is configured to measure the distance to the object using the distance lookup table on the basis of an output voltage of the second light receiving unit in association with emission of the infrared light having two or more emission strengths of the second light emitting unit or using an interpolation method based on the distance lookup table.

12. An infrared sensor module comprising:
    a first infrared sensor that includes a first light emitting unit configured to emit infrared light to an object, and first and second light receiving units configured to detect an amount of the infrared light reflected from the object at a first and second location, respectively; and
    a controller to measure reflectivity of the object using a peak output voltage of the first light receiving unit, and to measure the distance to the object using the measured object reflectivity and an output voltage of the second light receiving unit.

13. The infrared sensor module according to claim 12, wherein the first light receiving unit is arranged at the outside of the second light receiving unit.

14. The infrared sensor module according to claim 12, wherein the controller controls the first light emitting unit to alternately emit the infrared light having two or more emission strengths when measuring the object reflectivity.

15. The infrared sensor module according to claim 14, wherein the controller controls the first light emitting unit to emit the infrared light having two or more emission strengths when measuring the distance to the object.

16. An infrared sensor module comprising:
    an infrared sensor that includes first and second light emitting units configured to emit infrared light to an object and a first light receiving unit configured to detect an amount of the infrared light reflected from the object; and
    a controller to measure reflectivity of the object using a peak output voltage of the first light receiving unit in association with infrared light emission of the first light emitting unit, and to measure the distance to the object using the measured object reflectivity and an output voltage of the first light receiving unit in association with infrared light emission of the second light emitting unit.

17. The infrared sensor module according to claim 16, wherein the first light emitting unit is arranged at the outside of the second light emitting unit.

18. The infrared sensor module according to claim 16, wherein the controller controls the first light emitting unit to alternately emit the infrared light having two or more emission strengths when measuring the object reflectivity.

19. The infrared sensor module according to claim 18, wherein the controller controls the second light emitting unit to emit the one-strength infrared light when measuring the distance to the object.

20. The infrared sensor module according to claim 18, wherein the controller controls the second light emitting unit to emit the infrared light having two or more emission strengths when measuring the distance to the object.

* * * * *